US012573622B2

(12) United States Patent
Kang et al.

(10) Patent No.: US 12,573,622 B2
(45) Date of Patent: Mar. 10, 2026

(54) POSITIVE ELECTRODE ACTIVE MATERIAL FOR LITHIUM SECONDARY BATTERY AND MANUFACTURING METHOD THEREFOR

(71) Applicant: POSTECH ACADEMY-INDUSTRY FOUNDATION, Pohang-si (KR)

(72) Inventors: Byoung-woo Kang, Pohang-si (KR); Jung-hwa Lee, Gumi-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 744 days.

(21) Appl. No.: 16/979,959

(22) PCT Filed: Mar. 14, 2019

(86) PCT No.: PCT/KR2019/002951
§ 371 (c)(1),
(2) Date: Sep. 11, 2020

(87) PCT Pub. No.: WO2019/177394
PCT Pub. Date: Sep. 19, 2019

(65) Prior Publication Data
US 2021/0257613 A1 Aug. 19, 2021

(30) Foreign Application Priority Data
Mar. 15, 2018 (KR) ........................ 10-2018-0030434

(51) Int. Cl.
*H01M 4/525* (2010.01)
*C01G 45/12* (2006.01)
(Continued)

(52) U.S. Cl.
CPC ............ *H01M 4/525* (2013.01); *C01G 45/12* (2013.01); *C01G 53/50* (2013.01); *H01M 4/505* (2013.01);
(Continued)

(58) Field of Classification Search
CPC .... H01M 4/525; H01M 4/0471; H01M 4/364; H01M 4/505; H01M 10/0525;
(Continued)

(56) References Cited

U.S. PATENT DOCUMENTS

2009/0104531 A1 4/2009 Tanino et al.
2009/0297947 A1* 12/2009 Deng .................. H01M 10/052
429/231.95
(Continued)

FOREIGN PATENT DOCUMENTS

EP 3 118 916 * 1/2017
EP 2 660 907 * 9/2018
(Continued)

OTHER PUBLICATIONS

Machine translation of TR201504382A2. Obtained from PE2E (Year: 2016).*
(Continued)

*Primary Examiner* — Laura Weiner
(74) *Attorney, Agent, or Firm* — LEX IP MEISTER, PLLC

(57) ABSTRACT

A positive electrode active material for a lithium secondary battery and a method for manufacturing the same. The positive electrode material, wherein excess lithium is present to be inappropriate for a site balance, has a composition of $Li_{1+x+y}M_{1-y}O_2$ where x is an amount in which the excess lithium enters an tetrahedral site between a lithium layer and a transition metal layer, y is an amount in which the excess lithium enters an octahedral site of the transition metal layer, x and y are values that satisfy the charge balance, $0<x$, $y<1$, and M is at least one selected from Al, Mg, Mn, Ni, Co, Cr, V, Fe, Nb, Mo, Ru, Zr, and Ir, and 3d, 4d, and 5d transition metals except for the listed metals, and a layered non-rocksalt-type structure.

5 Claims, 3 Drawing Sheets

① Lot of TM mixing in Li layer ② Li$_{tet}$ surrounded by Li-O-Li

(51) Int. Cl.
 C01G 53/50 (2025.01)
 H01M 4/505 (2010.01)
 H01M 4/02 (2006.01)
 H01M 4/04 (2006.01)

(52) U.S. Cl.
 CPC ........................... *H01M 2004/021* (2013.01);
 *H01M 2004/028* (2013.01); *H01M 4/0471*
 (2013.01)

(58) Field of Classification Search
 CPC ...... H01M 2004/028; H01M 2004/021; C01G
 45/12; C01G 53/50; C01G 45/125; C01G
 53/00
 See application file for complete search history.

(56) References Cited

U.S. PATENT DOCUMENTS

| | | | | |
|---|---|---|---|---|
| 2012/0034503 | A1 * | 2/2012 | Toyama ................ | H01M 4/131 |
| | | | | 429/223 |
| 2012/0043500 | A1 | 2/2012 | Xiang et al. | |
| 2013/0244105 | A1 | 9/2013 | Chang et al. | |
| 2015/0064558 | A1 * | 3/2015 | Seki ...................... | H01M 4/525 |
| | | | | 429/223 |
| 2015/0111105 | A1 * | 4/2015 | Kato ..................... | H01M 4/525 |
| | | | | 429/231.3 |
| 2016/0013470 | A1 | 1/2016 | Paulsen et al. | |
| 2016/0190559 | A1 | 6/2016 | Hou et al. | |
| 2018/0145371 | A1 * | 5/2018 | Maeda ................. | H01M 4/525 |
| 2019/0088940 | A1 | 3/2019 | Ceder et al. | |

FOREIGN PATENT DOCUMENTS

| | | | | |
|---|---|---|---|---|
| JP | 2016-017017 | | 2/2016 | |
| KR | 20050111764 | | 11/2005 | |
| KR | 20150065840 | | 6/2015 | |
| KR | 20160063855 | | 6/2016 | |
| TR | 201504382 | A2 * | 1/2016 | ........... H01M 4/505 |
| WO | 2018022989 | | 2/2018 | |

OTHER PUBLICATIONS

Aziz Abdellahi et al., "Understanding the Effect of Cation Disorder on the Voltage Profile of Lithium Transition-Metal Oxides", Chem. Mater. 28, 5373-5383, Jul. 13, 2016. DOI: 10.1021/acs.chemmater.6b01438.

Rui Wang et al., "A disordered rock-salt Li-excess cathode material with high capacity and substantial oxygen redox activity: Li1.25Nb0.25Mn0.5O2", Electrochemistry Communications 60 (2015) 70-73. http://dx.doi.org/10.1016/j.elecom.2015.08.003.

Mizuki Nakajima et al., "Lithium-Excess Cation-Disordered Rocksalt-Type Oxide with Nanoscale Phase Segregation: Li1.25Nb0.25V0.5O2", Chem. Mater. 29, 6927-6935, Jul. 22, 2017. DOI: 10.1021/acs.chemmater.7b02343.

Junghwa Lee et al., "Understanding the cation ordering transition in high-voltage spinel LiNi0.5Mn1.5O4 by doping Li instead of Ni", Scientific Reports vol. 7, Article No. 6728, Jul. 27, 2017. DOI: 10.1038/s41598-017-07139-2.

Cahill, L.S., S.-C. Yin, A. Samoson, I. Heinmaa, L.F. Nazar, G.R. Goward. "6Li NMR Studies of Cation Disorder and Transition Metal Ordering in Li[Ni 1/3Mn 1/3Co1/3]02 Using Ultrafast Magic Angle Spinning", Chem. Mater., vol. 17, No. 26, Nov. 22, 2005, p. 6560-6566 (Year: 2005), total 7 pages.

Jena, Anirudha, et al. "Capacity enhancement of the quenched Li—Ni—Mn—Co oxide high-voltage Li-ion battery positive electrode." Electrochimica Acta 236 (2017): 10-17, Mar. 23, 2017, total 8 pages.

* cited by examiner

【FIG. 1】
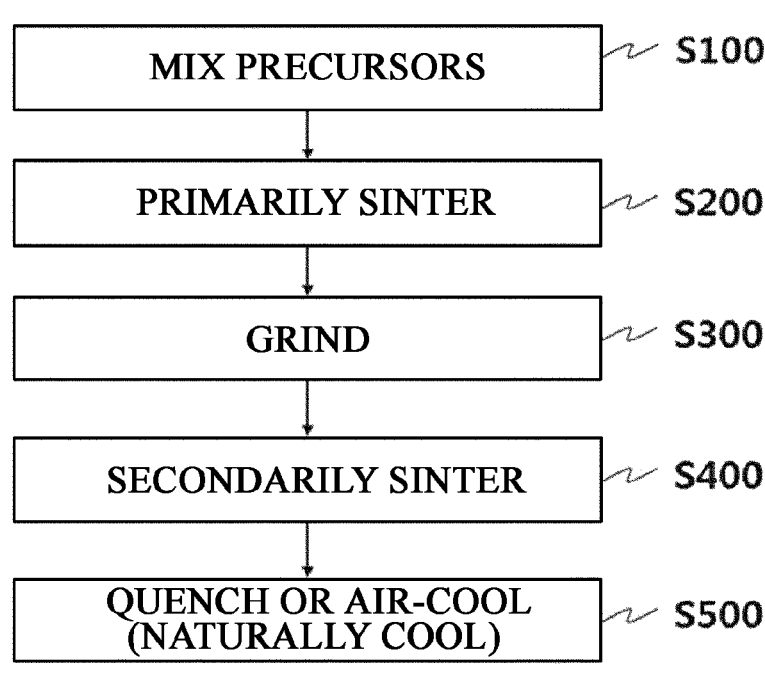
【FIG. 2】
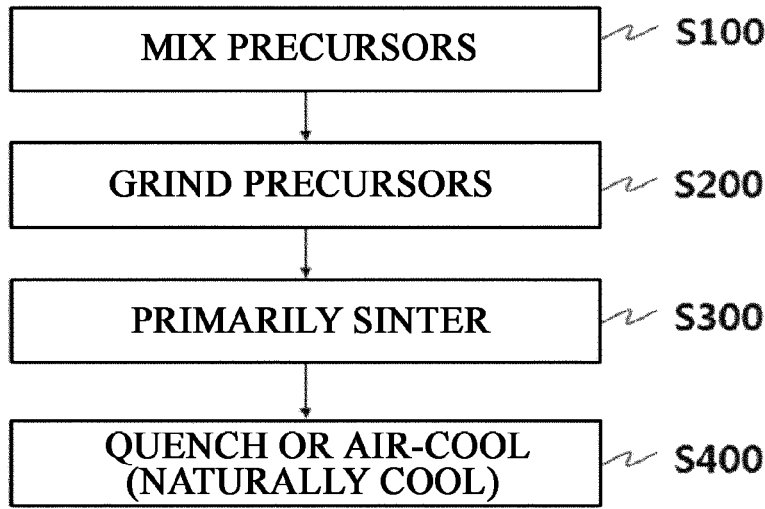

【FIG. 3】
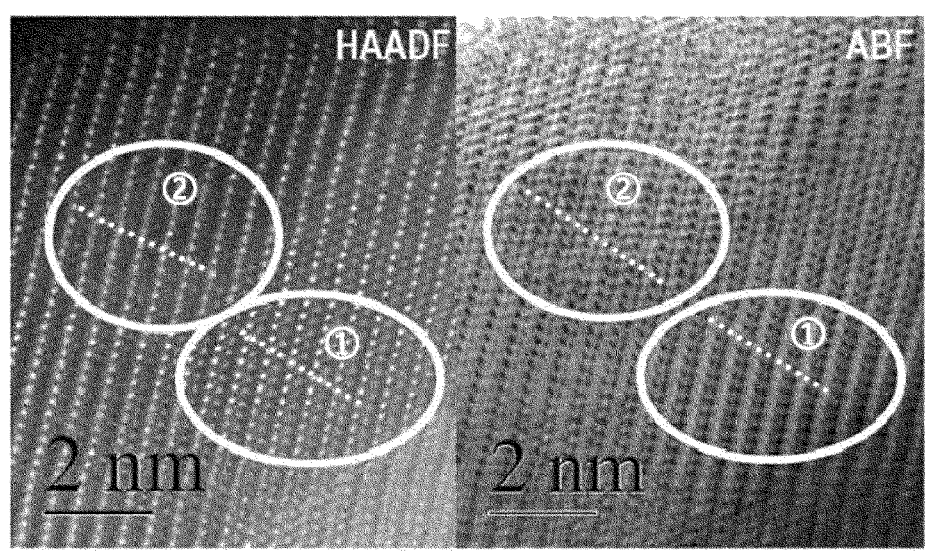
① Lot of TM mixing in Li layer
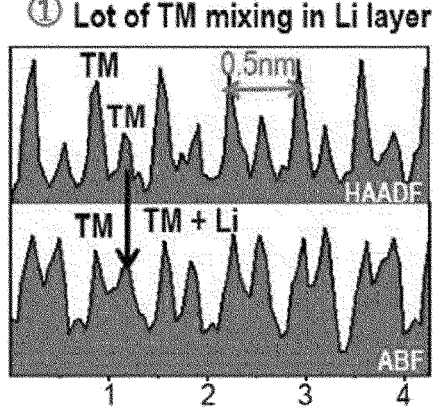
② Li$_{tet}$ surrounded by Li-O-Li
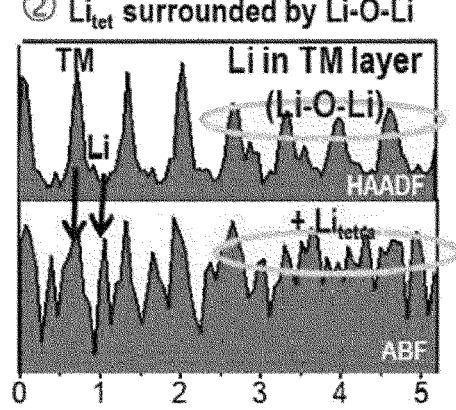

【FIG. 4】
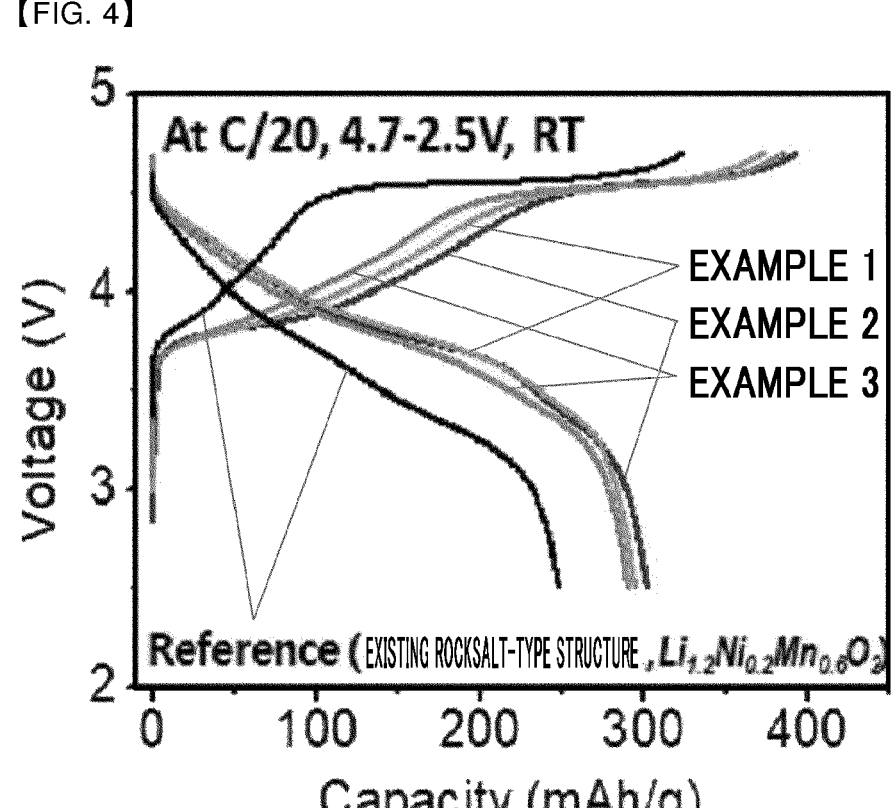

POSITIVE ELECTRODE ACTIVE MATERIAL FOR LITHIUM SECONDARY BATTERY AND MANUFACTURING METHOD THEREFOR

TECHNICAL FIELD

The present invention relates to a lithium-rich composite oxide which can be adequately used for a positive electrode active material for a lithium secondary battery and a method of preparing the same, and particularly, to positive electrode active material for a lithium secondary battery, which has a new composition, a non-rocksalt-type structure, and a new local structure, has significantly increased electrochemical activity, and thus can achieve high-capacity energy and significantly improved electrochemical performance, and a method of preparing the same.

BACKGROUND ART

Recently, since electric vehicles and energy storage systems requiring a large-capacity battery have rapidly developed with the development of electric, electronic, telecommunication, and computer industries, development of a secondary battery with high capacity as well as high safety is becoming very important in lithium-ion battery market. In particular, in order to use a lithium secondary battery to a medium and large-sized electric device such as an electric vehicle (HEV and EV), it is necessary to develop a high energy capacity positive electrode material which influences performance (particularly, energy density) of the battery and determines overall cost.

Most positive electrode active materials that have been extensively studied to date are lithium oxides having a 3d transition metal with a layered structure based on a rocksalt-type structure. For example, lithium transition metal oxides such as $LiCoO_2$ (lithium cobalt oxide, LCO)-based, $LiNiO_2$ (lithium nickel oxide, LNO), $LiMnO_2$ (lithium manganese oxide, LMO) has been used. Materials having such a structure mainly undergo a transition metal-based oxidation/reduction reaction, in which electrons are supplied by a 3d transition metal when lithium is intercalated/deintercalated.

The greatest feature of these materials is that the available energy capacity is determined by the oxidation number of lithium and the transition metal. That is, the energy capacity is limited by the ratio of lithium and the transition metal. Moreover, materials having the layered structure based on the rocksalt-type structure among positive electrode active materials undergo reaction in which the layered structure collapses or changes to another phase when a large amount of lithium is deintercalated, and thus there is a fundamental limitation to increase energy capacity. Therefore, positive electrode materials currently used have a fundamental limitation due to a storage method and structural instability to significantly improve energy capacity.

In addition, recently, LNO-based positive electrode active materials which are layered structure materials based on the rocksalt-type structure and are used to achieve high capacity energy are relatively cheap and exhibit a battery characteristic having higher discharge capacity compared to LCO-based positive electrode active materials. However, LNO-based positive electrode active materials have disadvantages in that they are vulnerable to exposure to air and moisture and when an overcharged battery is heated at 200° C. to 270° C., the reaction in which oxygen in a lattice is released by a rapid structural change is performed, and thus thermal safety is very weak.

To improve this, it has been suggested that a portion of nickel constituting the LNO-based positive electrode active materials are substituted with transition metal elements to slightly move a heat-generation start temperature to a high temperature or to prevent rapid heat generation. Among these, $LiNi_{1-x}Co_xO_2$ (x: 0.1-0.3) material in which a portion of nickel (Ni) is substituted with cobalt shows excellent charge/discharge characteristics and cycle life characteristics, but the thermal stability problem is not solved. In addition, the composition of Li—Ni—Mn-based composite oxide in which nickel is partially substituted with manganese, which has excellent thermal safety, or Li—Ni—Mn—Co—based composite oxide in which nickel is partially substituted with manganese and cobalt, and technologies related to their production are also widely known. However, cobalt, which is used as a raw material that enhances structural stability, has a disadvantage in that the cobalt is expensive due to limitation of resources, and thus has a limitation in price competitiveness.

In addition, recently, in order to realize high-capacity energy, a composite lithium metal oxide containing excess lithium in a layered structure based on the rocksalt-type structure, such as $Li_2MnO_3$, which is a layered structure based on a rocksalt-type structure having a composition below, has been proposed as an alternative. It is well known that the composite oxide layered structure containing excess lithium based on the rocksalt-type structure can achieve a higher capacity than existing materials by the transition metal participating in the redox reaction and oxygen in the oxidation/reduction reaction.

$$Li_{1+x}M_{1-x}O_2$$

or $$aLi_2MO_3 \cdot (1-a)LiMeO_2$$

(Where, $0<x<1$, $0<a<1$, M is any one element selected from among 3d, 4d, and 5d transition metals, which are Al, Mg, Mn, Ni, Co, Cr, V, Fe, Nb, Mo, Ru, Zr, and Ir, or simultaneously has at least two elements, and in this case, M and Me may be the same as or different from each other.)

The lithium-rich composite oxide based on the rocksalt-type structure of the above composition is a high-capacity material, and has the same layered structure as $Li_2MO_3$ and $LiMeO_2$ according to a typical method known in the art, and a transition metal as much as x in the transition metal layer having the layered structure exists in the form substituted with excess lithium. Despite these substitutions, the lithium-rich layered structure composite oxide based on the rocksalt-type structure is always stabilized in a form in which charge balance and site balance are appropriate. When lithium is deintercalated from such materials, manganese already has an oxidation number of +4 when charged in $Li_2MnO_3$, which is a typically well-known lithium-rich layered structure, and thus cannot be oxidized any more. Therefore, the manganese cannot contribute to the electrochemical reaction. However, it has been much reported that if a reaction in which a large amount of lithium is deintercalated occurs, additional electrons can be supplied by an oxidation/reduction reaction of oxygen in a structure other than a transition metal. In other words, it is known that, in the high voltage reaction of 4.5 V or higher in which a large amount of lithium escapes in order to activate this reaction at the first charge, electrons are supplied through the irreversible oxygen gas deintercalation reaction and the reversible oxidation/reduction reaction of oxygen, and thus the reaction in which a large amount of lithium escapes may be carried out.

Therefore, if electrons are additionally released/supplied by the reversible oxidation/reduction reaction of the transition metal and the reversible oxidation/reduction reaction of oxygen in the lithium-rich layered structure composite oxide based on the rocksalt-type structure, a high-capacity positive electrode active material may be secured.

Therefore, many studies are being carried out to increase the reversible oxygen oxidation/reduction reactivity of the lithium-rich layered structure composite oxide based on the rocksalt-type structure, where the reaction of oxygen may form an additional oxygen p-orbital of which the energy may overlap with that of the transition metal d-orbital from the viewpoint of the electronic structure when, in $Li_2MnO_3$ which is the lithium-rich layered structure, excess lithium is present in the transition metal layer. That is, since when excess lithium is present in the transition metal layer, oxygen cannot hybridize with the transition metal and is surrounded by lithium in the form of Li (lithium layer)-O (oxygen)-Li (transition metal layer), a high-energy p-orbital of un-hybridized oxygen is formed, and thus, the p-orbital of oxygen has additional electromagnetic states capable of supplying/consuming electrons. In this case, an un-hybridized oxygen state of Li (lithium layer)-O (oxygen)-Li (transition metal layer) may be formed by increasing an amount of excess lithium.

However, in the layered structure based on the rocksalt-type structure having a composition of excess lithium, a source of the anion reaction is the un-hybridized oxygen state of Li—O—Li. To achieve a high capacity, a large amount of lithium in the material should be deintercalated/intercalated, and accordingly, the lithium of the local structure of Li—O—Li is also removed at the end of charge, so that additional electronic states that can be formed by Li—O—Li are changed, thereby greatly affecting the stability of the oxidation/reduction reaction of oxygen. In particular, in the initial activation process, as lithium escapes from the un-hybridized oxygen state of Li—O—Li, 1) Li—O—Li becomes a form like vacancy-O-vacancy, and thus the stability of oxygen is weakened and the reaction in which the oxygen gas is released increases, or 2) the local structure is changed a lot by rearranging the transition metal around the vacancy, and thereby performance may be largely deteriorated. Particularly, when an irreversible reaction of oxygen gas release occurs, densification occurs at the particle surface, and this change can have a great influence on the deintercalation and intercalation of lithium in the next charge/discharge cycle, resulting in decrease in output performance and capacity retention.

In addition, the lithium-rich layered structure composite oxide based on the rocksalt-type structure have increased structural instability that occurs in a highly charged state (a state in which a large amount of lithium has been removed). In order to eliminate this structural instability, manganese ions move from the surface to the empty space in which lithium is deintercalated, and thus the local structure may become spinel-like. This change in the surface structure causes a problem of reducing the charging/discharging voltage of the material, and thus the energy density decreases as the cycle proceeds. In order to solve this problem, many studies are being conducted using the existing lithium-rich layered structure composite oxide based on the rocksalt-type structure. For example, performance is partially improved through an attempt to coat an oxide/fluoride on the surface of the particles or dope an element such as cobalt.

However, since there is a limitation in terms of energy density in order to use a typically well-known positive electrode active material of a lithium secondary battery in electric vehicles and medium-and large-sized equipment, there is an increasing need to develop a lithium-rich material (Li-excess or Li-rich material) based on the rocksalt-type structure that may reversibly use cations/anions at the same time to achieve high capacity. However, in order to secure high capacity in such a material and to reversibly use all of a large amount of lithium, a stable anion reaction should be maximized simultaneously so that the supply/demand of electrons can be smoothly achieved by structural stability and reversible oxidation/reduction reaction of cations/anions.

DISCLOSURE OF THE INVENTION

Technical Problem

The present invention provides a positive electrode active material for a lithium secondary battery having a new composition and structure that can solve problems of unstable anion reaction and limited electrochemical reversibility in a typical lithium-rich composite oxide based on a rocksalt-type structure.

The present invention also provides a method of prepare a positive electrode active material for a lithium secondary battery having a new composition and structure.

Technical Solution

An embodiment of the present invention provides a positive electrode active material for a lithium secondary battery which has a composition of [Formula 1] below and a layered non-rocksalt-type structure, wherein excess lithium is present to be appropriate for a charge balance and inappropriate for a site balance, and the excess lithium enters a tetrahedral site as well as an octahedral site.

$$Li_{1+x+y}M_{1-y}O_2 \qquad \text{[Formula 1]}$$

x is an amount in which the excess lithium enters the tetrahedral site between a lithium layer and a transition metal layer, y is an amount in which the excess lithium enters the octahedral site of the transition metal layer, x and y are values that satisfy the charge balance, $0<x$, $y<1$, and M is at least one selected from Al, Mg, Mn, Ni, Co, Cr, V, Fe, Nb, Mo, Ru, Zr, and Ir, and 3d, 4d, and 5d transition metals except for the listed metals.)

Another embodiment of the present invention provides a method of preparing a positive electrode active material including: preparing a mixture by mixing a plurality of metal precursors; primarily sintering the mixture by heating at a first temperature range; grinding the primarily sintered material after cooling; secondarily sintering the ground material by heating at a second temperature range; and cooling the secondarily sintered material at a cooling rate of air-cooling or more.

Still another embodiment of the present invention provides a method of preparing a positive electrode active material including: preparing a mixture by mixing a plurality of metal precursors; grinding the mixture; sintering the ground material by heating at a third temperature range; and cooling the sintered material at a cooling rate of air-cooling or more.

Advantageous Effects

A lithium-rich composite oxide based on a non-rocksalt-type structure according to the present invention has a totally different composition and lithium/transition metal distribution from a typical rocksalt-type structure, and thus an unstable anion reaction caused in an un-hybridized oxygen state of unstable Li—O—Li may be fundamentally solved.

In addition, the lithium-rich composite oxide based on the non-rocksalt-type structure according to the present invention may form a particular local structure by adding lithium in an excessive amount to be appropriate for a charge balance and inappropriate for a site balance, and may form a new stable un-hybridized oxygen state by such a local structure, thereby suppressing an irreversible structural change. Thus, energy capacity and reversibility according to a cycle may be significantly improved by an anion reaction.

Further, the lithium-rich composite oxide based on the non-rocksalt-type structure according to the present invention may reduce a decrease in the voltage and capacity or a structural change such as a spinel-like layered structure, which are issues caused by an anion reaction in a typical lithium-rich composite oxide based on the rocksalt-type structure.

Through these effects, a lithium secondary battery using, as a positive electrode active material, the lithium-rich composite oxide based on the non-rocksalt-type structure according to the present invention achieves high-capacity energy and exhibits improved electrochemical performance compared to the related art.

By a method according to the present invention, the lithium-rich composite oxide based on the non-rocksalt-type structure may be easily prepared.

BRIEF DESCRIPTION OF THE DRAWINGS

FIG. 1 is a flow chart illustrating a process of preparing a lithium-rich composite oxide according to an embodiment of the present invention;

FIG. 2 is a flow chart illustrating a process of preparing a lithium-rich composite oxide according to another embodiment of the present invention;

FIG. 3 illustrates STEM analysis results of lithium-rich composite oxide powder prepared according to Example 1 of the present invention; and FIG. 4 illustrates results of evaluating charge and discharge characteristics of Li-rich $Li_{1.3}Ni_{0.35}Mn_{0.5}O_2$, $Li_{1.33}N_{10.33}Mn_{0.5}O_2$, and $Li_{1.27}Ni_{0.32}Mn_{0.522}O_2$ prepared according to Examples 1 to 3 of the present invention.

BEST MODE FOR CARRYING OUT THE INVENTION

Hereinafter, the invention will be described in more detail on the basis of preferred embodiments of the invention. However, the following embodiments are merely examples for helping understanding of the invention, and the scope of the invention is not reduced or limited by the embodiments.

Conventionally, only a composition has been reported that lithium is added in an excessive amount to be appropriate for a charge balance and a site balance like a lithium-rich composite oxide based on a rocksalt-type structure of [Formula 2] below:

$$aLi_2MO_3.(1-a)LiMeO_2$$

or $$Li_{1+x}M_{1-x}O_2 \qquad \text{[Formula 2]}$$

(Where, $0<x<1$, $0<a<1$, M is any one element selected from among 3d, 4d, and 5d transition metals, which are Al, Mg, Mn, Ni, Co, Cr, V, Fe, Nb, Mo, Ru, Zr, and Ir, or simultaneously has at least two elements. In this case, M and Me may be the same as or different from each other.)

The present invention provides a lithium-rich composite oxide based on a non-rocksalt-type structure having a new composition and a distribution of cations to solve the problem of unstable anion reaction of the typical lithium-rich composite oxide based on the rocksalt-type structure.

The positive electrode active material for a lithium secondary battery according to the present invention is composed of the lithium-rich composite oxide, has the non-rocksalt-type structure, and forms an Li—O—Li environment having a new type local structure because excess lithium added to be appropriate for a charge balance and inappropriate for a site balance is more added to a tetrahedral site that is a new site as well as an octahedral site in which lithium occupies in the typical lithium-rich composite oxide, and accordingly may form a new type un-hybridized oxygen state, thereby increasing reversibility of anions.

In addition, a new local structure generated by the positive electrode active material according to the present invention can reduce the migration of the transition metals amount of lithium is to be occurred when a large deintercalated. Thus, even though a large amount of lithium is intercalated/deintercalated, reversible high-capacity energy may be achieved though a stable anion reaction and a minimum structural change.

The positive electrode active material according to the present invention has a composition of [Formula 1] below, and the layered non-rocksalt-type structure, wherein excess lithium is present to be inappropriate for a site balance, and the excess lithium further enters the tetrahedral site as well as the octahedral site.

$$Li_{1+x+y}M_{1-y}O_2 \qquad \text{[Formula 1]}$$

(x is an amount in which the excess lithium enters the tetrahedral site between a lithium layer and a transition metal layer, y is an amount in which the excess lithium enters the octahedral site of the transition metal layer, x and y are values that satisfy the charge balance, $0<x$, $y<1$, and M is at least one selected from Al, Mg, Mn, Ni, Co, Cr, V, Fe, Nb, Mo, Ru, Zr, and Ir, and 3d, 4d, and 5d transition metals except for the listed metals.)

That is, the positive electrode active material according to the present invention achieves the charge balance by adjusting an amount of lithium and transition metals, but the site balance is not suitable, so that excess lithium is present at an interstitial site, thereby achieving high-capacity through a high oxygen ion reaction in addition to the theoretical capacity due to the transition metals in the lithium-rich (Li-excess) composite oxide based on the non-rocksalt-type structure in an inconsistent form.

In addition, the positive electrode active material according to the present invention has not only the excessive lithium in the octahedral site of the transition metal layer like the typical lithium-rich composite oxide based on the rocksalt-type structure, but also has the excessive lithium in the tetrahedral site due to inappropriate site balance, and thus has a local structure in a form different from that of the typical lithium-rich composite based on the rocksalt-type structure. Accordingly, electrochemical reactions completely vary, and particularly, anion electrochemical activities and reactions vary.

In particular, when comparing the forms of reversible and irreversible reactions of oxygen reacting at about 4.5 V at the first charge, it can be confirmed that the typically known lithium-rich layered composite has a consistent voltage (a voltage plateau at about 4.5 V), whereas through the electrochemical property of the material according to the present invention having a form with a sloppy inclination at about 4.5 V, it can be clearly seen from FIG. 4 that the material according to the present invention has a different form of reaction from the existing lithium-rich $Li_{1+x}M_{1-x}O_2$—based oxide based on the rocksalt-type structure and a different form of reversible and irreversible reaction of oxygen.

In addition, in the positive active material according to the present invention, the x and y are preferably greater than 0 and less than 0.3 because this composition satisfies the charge balance and allows the excess lithium to exist in the octahedral site of the transition metal layer and in the tetrahedral site between the transition metal layer and the lithium layer. The transition metal constituting the layered non-rocksalt-type structure preferably has such a range since a range of 0-30% of cation disordering between the lithium layer and the transition metal layer maintains the layered structure and too much cation disordering makes too large lithium ion diffusion barrier.

In addition, the positive electrode active material according to the present invention may be a material having the composition of [Formula 1] above, and the layered non-rocksalt-type structure, wherein the excess lithium is present to be inappropriate for the site balance, and when analyzing through HAADF and ABF of STEM, the excess lithium is present in the octahedral site and the tetrahedral site of the transition metal layer and the element distribution having a form, in which cation disordering between the lithium layer and the transition metal layer of the layered structure is present at the same time, is observed on a scale of 2 nm to 100 nm.

In addition, the positive electrode active material according to the present invention may be a material having the composition of [Formula 1] above, and the layered non-rocksalt-type structure, wherein the excess lithium is present to be inappropriate for the site balance, the excess lithium enters the octahedral site and the tetrahedral site, and when identifying with Raman spectrometer, the area in 600-700 $cm^{-1}$, which is a range of Raman shifts by a spinel, is 10% or more of the entire area.

In addition, the positive electrode active material according to the present invention may be a material having the composition of [Formula 1] above, and the layered non-rocksalt-type structure, wherein the excess lithium is present to be inappropriate for the site balance, the excess lithium enters the octahedral site and the tetrahedral site, and when analyzing with Li-NMR, the amount of lithium in 700-900 ppm which is a range that the lithium present in the tetrahedral site exhibits is 5-30% of a total amount of lithium.

The positive electrode active material according to the present invention can be easily synthesized by methods below.

One synthesis method includes: preparing a mixture by mixing a plurality of metal precursors; primarily sintering the mixture by heating at a first temperature range; grinding the primarily sintered material after cooling; secondarily sintering the ground material by heating at a second temperature range; and cooling the secondarily sintered material at a cooling rate of air-cooling or more.

Another synthesis method includes: preparing a mixture by mixing a plurality of metal precursors; grinding the mixture; sintering the ground material by heating at a third temperature range; and cooling the sintered material at a cooling rate of air-cooling or more.

In preparation method, the metal precursors include lithium precursors and transition metal precursors.

In the preparation method, the first temperature range is preferably 700° C. to 1, 000° C. because the excess lithium can have solubility in which the excess lithium can exist in the octahedral site and the tetrahedral site, and a phase of a form in which cation disordering between the lithium layer and the transition metal layer of the layered structure is present at the same time can be formed. More preferably, the first temperature range is 800° C. to 900° C.

In the preparation method, the second temperature range is preferably 700° C. to 1,000° C. because the excess lithium can have solubility in which the excess lithium can exist in the octahedral site and the tetrahedral site, and a phase of a form in which cation disordering between the lithium layer and the transition metal layer of the layered structure is present at the same time can be formed. More preferably, the second temperature range is 800° C. to 900° C..

In the preparation method, the third temperature range is preferably 700° C. to 1,000° C. because the excess lithium can have solubility in which the excess lithium can exist in the octahedral site and the tetrahedral site, and a phase of a form in which cation disordering between the lithium layer and the transition metal layer of the layered structure is present at the same time can be formed. More preferably, the third temperature range is 800° C. to 900° C..

Hereinafter, specific examples of the invention are presented. However, the examples described below are only intended to illustrate or explain the invention, and thus the invention should not be limited thereto.

EXAMPLES

FIG. 1 is a flow chart illustrating a process of preparing a lithium-rich composite oxide according to an embodiment of the present invention.

Referring to FIG. 1, a method according to an example of the present invention includes the steps of: mixing lithium precursors and transition metal precursors (S100); putting the mixture in a heating furnace and primarily sintering the mixture in an air atmosphere (S200); cooling the primarily sintered material and grinding the material with a high-energy ball mill (S300); putting the ground material in a sintering furnace and secondarily sintering the ground material in an air atmosphere (S400); and cooling the secondarily sintered material (S500).

The step of mixing the lithium precursors and transition metal precursors (S100) may further include a pretreatment process of pelletizing in addition to the step of mixing and drying each of raw precursors. This process enables a composite oxide having more uniform properties to be prepared.

In the mixing process of the raw materials, each of the metal precursors may be added to an acetone solvent and then be mixed using a ball mill. Herein, ball milling may be performed for about 6 hours to about 24 hours. In this case, when the ball milling is performed for less than 6 hours, dissolution, grinding, or mixing of the added precursors is not sufficient, and, when the ball milling is performed for greater than 24 hours, it may be economically disadvantageous because the processing time is extended while a mixing effect is saturated. In the examples of the present invention acetone is used as the solvent, but any material may be used without limitation as long as the material may appropriately mix the precursors and does not affect a subsequent process. Also, if a uniform mixture of the prepared precursors may be prepared without ball milling, the precursors may be mixed by a simple stirring process.

In the drying process, the precursors mixed by the mixing process may be heated to a predetermined temperature to remove the solvent. In the drying process, the mixture including the solvent is heated to less than about 100° C. by using equipment such as a hot plate. In this case, if the mixture is heated to greater than 100° C., the precursors may react to form a different phase.

The pelletizing process is to facilitate the synthesis by allowing a gas component decomposed in the subsequent process to be easily released, wherein pellets having an average diameter of 1 cm may be made by using a pelletizing device. However, the diameter of the pellet is not particularly limited in the pelletizing process.

$Li_2CO_3$ and $LiNO_3$ may be used as the lithium precursor. The transition metal precursors provide a transition metal component to the composition of [Formula 1] above, and may include, for example, manganese precursors and/or nickel precursors. The transition metal precursors are not particularly limited as long as these are any materials which can be synthesized by a solid-state reaction method.

In the step of putting the mixture in the heating furnace and primarily sintering the mixture in an air atmosphere (S200), the sintering process is performed at 800° C. to 900° C. to remove carbonate or nitrate chemically bonded to metal oxide, metal nitride, and metal oxynitride, resulting in synthesis between metal components in the mixture.

The step of cooling the primarily sintered material and then grinding the material with the high-energy ball mill (S300) is mechanically grinding the primarily sintered material to adjust a particle size of the primarily sintered material, and if this step is not performed, even though the secondary sintering process is performed, the synthesis ratio of the positive electrode active material according to the present invention may be significantly reduced. The grinding process may be performed, for example, for 2-3 hours, but it may vary depending on the state of the materials to be synthesized.

In the examples of the present invention, the high-energy ball mill is used, but may be also performed through a method such as a high-pressure water milling, an air-jet mill, and a roller mill if the method is capable of adjusting the particle size of the powder.

The step of putting the ground material in the sintering furnace and secondarily sintering the ground material in an air atmosphere (S400) is sintering again (annealing) the ground composite at a temperature of about 700° C. or higher. In this case, when sintering time is excessively increased, since a particle size is increased, an initial activation process may not be performed well, and when sintering time is too short, since it is difficult to obtain a desired material, the sintering is preferably performed for 1-10 hours.

The step of cooling the secondarily sintered material (S500) is maintaining the phase adjusted by the secondarily sintering step to room temperature through a quick cooling, which has at least a certain level of cooling rate, such as air-cooling, and preferably water quenching.

Depending on the cooling rate, the surface characteristics may be different (for example, byproducts such as $Li_2CO_3$ are produced on the surface when air-cooling), but it is confirmed that bulk characteristics in examples below are scarcely different through XRD patterns and NMR results. In addition, byproducts such as $Li_2CO_3$ produced when air-cooling may be easily removed by water washing or a typically known cleaning method.

FIG. 2 is a flow chart illustrating a process of preparing a lithium-rich composite oxide according to another embodiment of the present invention.

Referring to FIG. 2, a method of preparing the lithium-rich composite oxide according to another embodiment of the present invention includes the steps of: mixing lithium precursors and transition metal precursors (S100); grinding the mixed precursors (S200); putting the ground material in a sintering furnace and sintering the ground material in an air atmosphere (S300); and cooling the sintered composite (S400).

When comparing the above-described method, the preparation method according to another embodiment has a difference in that the mixed precursors are not primarily sintered, but immediately after the mixing, the mixed precursors are subjected to the grinding process and then to the sintering process.

The material prepared by the method according to another embodiment partially differs from the material prepared by the preparation method according to FIG. 1 with respect to the surface characteristics, but there is no remarkable difference with respect to the bulk characteristics, and the preparation method according to another embodiment is simpler than the preparation method of FIG. 1, and thus has an advantage of a possible rapid and economic synthesis.

In the examples of the present invention, the solid-state reaction method is used, but the embodiment of the present invention is not limited thereto because, regardless of a synthesis method such as a co-precipitation method, an ion exchange reaction under hydrothermal condition, and an ultrasonic spray pyrolysis, any synthesis method can achieve the desired performance of the present invention when the method has a composition and structure specified by the present invention.

Example 1

In Example 1 of the present invention, nickel (Ni) and manganese (Mn) were used as a transition metal, and $Li_{1.3}Ni_{0.35}Mn_{0.5}O_2$ was synthesized by the method illustrated in FIG. 2 by selecting x as 0.15 and y as 0.15 in [Formula 1] above.

Specifically, as precursors for a solid-state reaction, $Li_2CO_3$ (1 g), $NiCO_3$ (0.866 g), and $MnO_2$ (0.906 g) were prepared so that $Li_2CO_3$ (Junsei, purity 99% or more), $NiCO_3$ (Alfa Aesar, purity 99% or more), and $MnO_2$ (Alfa Aesar, purity 99% or more) became the ratio below:

$$0.65Li_2CO_3 + 0.35NiCO_3 + 0.5MnO_2$$

After the precursors thus prepared were added to an acetone solvent, a uniformly mixture was prepared by high-energy ball milling for about 6 hours. Zirconia balls having diameters of 3.5 mm and 10 mm were used for the ball milling, and zirconia balls having a diameter of 1 mm were used for the high-energy ball milling.

The mixture, which was mixed by the ball milling, was dried at a temperature of 100° C. or less in air using a hot plate, and the dried mixture was formed into pellets using a disc-shaped mold.

The pellets thus prepared were put in an alumina crucible and sintered at 900° C. in an air atmosphere for about 10 hours. In this case, a heating rate was 4° C./min and the sintered pellets were taken out from a sintering furnace immediately after heating and subjected to an air-cooling process in air.

Example 2

In Example 2 of the present invention, nickel (Ni) and manganese (Mn) were selected as a transition metal, and $Li_{1.33}N_{10.33}Mn_{0.5}O_2$ was synthesized by the method illustrated in FIG. 2 by selecting x as 0.16 and y as 0.17 in [Formula 1] above.

Specifically, as precursors for a solid-state reaction, $Li_2CO_3$ (1 g), $NiCO_3$ (0.799 g), and $MnO_2$ (0.887 g) were prepared so that $Li_2CO_3$ (Junsei, purity 99% or more), $NiCO_3$ (Alfa Aesar, purity 99% or more), and $MnO_2$ (Alfa Aesar, purity 99% or more) became the ratio below:

$$0.665Li_2CO_3+0.33NiCO_3+0.5MnO_2$$

After the precursors thus prepared were added to an acetone solvent, a uniformly mixed mixture was prepared while aggregated powder of the precursors was disintegrated by high-energy ball milling for about 6 hours. Zirconia balls having diameters of 3.5 mm and 10 mm were used for the ball milling, and zirconia balls having a diameter of 1 mm were used for the high-energy ball milling.

The mixture, which was mixed by the ball milling, was dried at a temperature of 100° C. or less in air using a hot plate, and the dried mixture was formed into pellets using a disc-shaped mold.

The pellets thus prepared were put in an alumina crucible and sintered at 900° C. in an air atmosphere for about 10 hours. In this case, a heating rate was 4° C./min and the sintered pellets were taken out from a sintering furnace immediately after heating and subjected to an air-cooling process in air.

Example 3

In Example 3 of the present invention, nickel (Ni) and manganese (Mn) were selected as a transition metal, and $Li_{1.27}Ni_{0.32}Mn_{0.522}O_2$ was synthesized by the method illustrated in FIG. 2 by selecting x as 0.112 and y as 0.158 in [Formula 1] above.

Specifically, as precursors for a solid-state reaction, $Li_2CO_3$ (1 g), $NiCO_3$ (0.810 g), and $MnO_2$ (0.969 g) were prepared so that $Li_2CO_3$ (Junsei, purity 99% or more), $NiCO_3$ (Alfa Aesar, purity 99% or more), and $MnO_2$ (Alfa Aesar, purity 99% or more) became the ratio below:

$$0.65Li_2CO_3+0.35NiCO_3+0.5MnO_2$$

After the precursors thus prepared were added to an acetone solvent, a uniformly mixture was prepared while aggregated powder of the precursors was disintegrated by high-energy ball milling for about 6 hours. Zirconia balls having diameters of 3.5 mm and 10 mm were used for the ball milling, and zirconia balls having a diameter of 1 mm were used for the high-energy ball milling.

The mixture, which was mixed by the ball milling, was dried at a temperature of 100° C. or less in air using a hot plate, and the dried mixture was formed into pellets using a disc-shaped mold.

The pellets thus prepared were put in an alumina crucible and sintered at 900° C. in an air atmosphere for about 10 hours. In this case, a heating rate was 4° C./min and the sintered pellets were taken out from a furnace immediately after heating and subjected to an air-cooling process in air.
Analysis of Distribution of Lithium and Transition Metal of Composite Oxide FIG. 3 illustrates STEM analysis results of lithium-rich composite oxide powder prepared according to Example 1 of the present invention.

As demonstrated in FIG. 3, it can be seen that the composite oxide powder prepared according to Example 1 of the present invention differs from the typical lithium-rich composite oxide of the rocksalt-type structure as parts (1) and 2 when viewed from HAADF and ABF images through STEM.

In particular, in part 1, it can be confirmed that the transition metals, which are not seen in the lithium layer of the typical lithium-rich composite oxide of the rocksalt-type structure, are present in the lithium layer and seen in the HAADF image.

In contrast, in part 2, it can be confirmed that a form, in which the ratio of the transition metal in the transition metal layer of the typical lithium-rich composite oxide of the rocksalt-type structure decreases, is seen in the HAADF image and from the ABF image, a large amount of lithium is present in this part. Moreover, it can be seen that in the transition metal layer, lithium enters in the octahedral site of the transition metal not to be present regularly in a space of 0.25 nm, but for atoms to be distributed in a narrower space than 0.25 nm, and since a large amount of lithium is present, it can be confirmed that lithium is present in the tetrahedral site.

In particular, it is confirmed that the arrangement of atoms is present on a scale of 2-100 nm on the STEM image.
Analysis of Local Structure and Lithium Distribution The lithium-rich composite oxide of the non-rocksalt-type structure prepared according to Example 1 of the present invention and the typical lithium-rich composite oxide of the rocksalt-type structure are compared by Raman and Li-NMR, and the results are listed in Table 1 and 2 below.

$Li_{1.2}Ni_{0.2}Mn_{0.6}O_2$, which is the prior research result of the present inventors, was used as the lithium-rich composite of the rocksalt-type structure for comparison.

TABLE 1

| Peak area (%) | Rocksalt-type structure lithium-rich $Li_{1.2}Ni_{0.2}Mn_{0.6}O_2$ | | Non-rocksalt-type structure lithium-rich $Li_{1.3}Ni_{0.35}Mn_{0.5}O_2$ | |
|---|---|---|---|---|
| LNMO ① $(A_{1g})$ \| ① (Eg) | 51.6 | 21.5 | 45 | 29 |
| $Li_2MnO_3$ ② $(A_{1g})$ \| ② (Eg) | 8.1 | 12.2 | 0 | 9.5 |
| Spinel-like ③ | | 6.6 | | 16.5 |

As shown in Table 1 above, through Raman analysis, unlike the lithium-rich composite oxide of the rocksalt-type structure, the composite oxide according to Example 1 of the present invention had a significantly increased amount of parts forming the spinel-like form. This result shows that a large amount of lithium is present in the tetrahedral site and cation mixing is formed between the transition metal layer and the lithium layer.

TABLE 2

| Lithium content (%) | Rocksalt-type structure lithium-rich $Li_{1.2}Ni_{0.2}Mn_{0.6}O_2$ | Non-rocksalt-type structure lithium-rich $Li_{1.3}Ni_{0.35}Mn_{0.5}O_2$ |
|---|---|---|
| Li layer of LNMO (to 500 ppm) | 14 | 50 |
| Li layer of $Li_2MnO_3$ (to 600 ppm) | 64 | 22 |
| Transition metal layer of LNMO (to 1200 ppm) | 2 | 5 |
| Transition metal layer of $Li_2MnO_3$ (to 1300 ppm) | 15 | 4 |

TABLE 2-continued

| Lithium content (%) | Rocksalt-type structure lithium-rich $Li_{1.2}Ni_{0.2}Mn_{0.6}O_2$ | Non-rocksalt-type structure lithium-rich $Li_{1.3}Ni_{0.35}Mn_{0.5}O_2$ |
|---|---|---|
| Tetrahedral Li (to 800 ppm) | 5 | 19 |

As shown in Table 2 above, it can be confirmed that in $Li_{1.2}Ni_{0.2}Mn_{0.6}O_2$ which is the typical lithium-rich composite oxide of the rocksalt-type structure, lithium (Li) is not present much in the tetrahedral site while in the lithium-rich composite oxide prepared according to Example 1 of the present invention, a large amount of lithium (Li) is present in the tetrahedral site.

In addition, the peak form of NMR is still broader than that of the typical lithium-rich composite oxide of the rocksalt-type structure. This form is similar to the form in which a lot of cation mixing is formed between the transition metal layer and the lithium layer. This is similar to the Raman analysis result.

Up to date, any material, in which quantitatively, an excessive amount of lithium (Li) is present in the tetrahedral site on a spinel in the vicinity of 800-900 ppm (Li) and excess lithium is present in an amount of approximately 10% or more in the tetrahedral site as well as in the octahedral site, has not been reported. That is, the lithium-rich composite oxide synthesized according to the present invention has a new structure that is not known before.

Evaluation of Charge and Discharge Characteristics

In order to evaluate electrochemical behavior when the lithium-rich composite oxide prepared according to Example 1-3 of the present invention is used as a positive electrode active material of a lithium secondary battery, a test battery was prepared. In this case, for comparison, a battery using $Li_{1.2}Ni_{0.2}Mn_{0.6}O_2$, which is the lithium-rich composite oxide of the rocksalt-type structure, was prepared.

Specifically, after 70 wt % of the composite oxide as a positive electrode active material, 25 wt % of super P as carbon powder, and 5 wt % of PVDF as a binder were put in a mortar, well mixed for 20-30 minutes, and stirred for about 2 hours, an aluminum foil was well coated with the mixture, dried for 12 hours in a vacuum chamber, and then punched with an 8 mm-punch to prepare a positive electrode of 1-3 mg, and the above process was performed in a glove box (in an argon atmosphere). Cell assembly was performed using the positive electrode prepared as described above, wherein Celgard 2400 was cut to about 13 mm and used as a separator during the cell assembly, 1 M $LiPF_6$ in a solution, in which ethylene carbonate/dimethyl carbonate were mixed in a weight ratio of 1:1, was used as an electrolyte, and a lithium metal was used as a negative electrode.

Electrochemical behavior of the cell prepared as described above was measured at room temperature. Maccor series 4000 was used as a measurement instrument, charging from 2.5 V to 4.7 V was first started during the measurement, and the measurement was made by applying a current of 14 mA/g at C/20 rate for both charge and discharge in a first cycle. FIG. 4 illustrates results of evaluating charge and discharge characteristics of Li-rich $Li_{1.3}Ni_{0.35}Mn_{0.5}O_2$, $Li_{1.33}Ni_{0.33}Mn_{0.5}O_2$, and $Li_{1.27}Ni_{0.32}Mn_{0.522}O_2$ prepared according to Examples 1-3 of the present invention. The black curve in FIG. 4 shows $Li_{1.2}Ni_{0.2}Mn_{0.6}O_2$ that is the lithium-rich composite of the rocksalt-type structure and is synthesized by the solid-state reaction method.

It is known that an irreversible oxygen gas release reaction and a reversible oxygen ion oxidation/reduction (redox) reaction occur in the typical lithium-rich composite oxide based on the rocksalt-type structure at a high voltage of 4.5 V or more in an initial charge process.

However, the lithium-rich composite oxide based on the non-rocksalt-type structure according to the present invention shows a voltage distribution different from the distribution in the case where reversible and voltage irreversible reactions of oxygen occur at 4.5 V or more in the typical lithium-rich $Li_{1+x}M_{1-x}O_2$ composite oxide based on the rocksalt-type structure.

In particular, during the first charge, a voltage plateau at about 4.5 V can be seen in the typical lithium-rich layered composite oxide while the composite oxide according to the present invention has a sloppy inclination at about 4.5 V. Through this electrochemical property, the material according to the present invention has a different form of reaction from the typical lithium-rich $Li_{1+x}M_{1-x}O_2$—based oxide based on the rocksalt-type structure and a different form of reversible and irreversible reaction of oxygen.

In addition, the lithium-rich $Li_{1+x+y}M_{1-y}O_2$ oxide based on the non-rocksalt-type structure according to the present invention exhibits higher oxygen ion operation voltage and anion reactivity than those of the typical lithium-rich $Li_{1+x+y}M_{1-y}O_2$ composite oxide based on the rocksalt-type and hardly show a problem of structural change by the anion reaction shown in the anion reaction of the typical composite oxide.

Test results of the cycle performance of the battery using the composite oxide prepared according to Example 1 of the present invention are listed in Table 3 below.

TABLE 3

| Cycle characteristics | Rocksalt-type structure lithium-rich $Li_{1.2}Ni_{0.2}Mn_{0.6}O_2$ | | Non-rocksalt-type structure lithium-rich $Li_{1.3}Ni_{0.35}Mn_{0.5}O_2$ | |
|---|---|---|---|---|
| C/3-C3/retention | Discharge capacity | Average voltage | Discharge capacity | Average voltage |
| Two cycles | 200 mAh/g | 3.58 V | 250 mAh/g | 3.74 V |
| 70 cycles | 120 mAh/g | 3.30 V | 240 mAh/g | 3.73 V |
| 100 cycles | — | — | 230 mAh/g | 3.72 V |

As shown in Table 3 above, the composite oxide according to Example 1 of the present invention has significantly decreased voltage drop compared to the typical lithium-rich layered structure composite oxide. In addition, since the voltage form in the occurrence of a phase change into a spinel-like phase in the vicinity of 2.9 V during the cycle progression is not seen, a spinel-like structural change is not considered to occur.

Although the technical spirit of the invention has been described in conjunction with the accompanying drawings, this illustrates the preferred embodiments of the invention, but is not intended to limit the invention. Furthermore, it will be apparent to those skilled in the art that various modifications and imitations are possible within a range that does not depart from the scope of the technical spirit of the invention.

The invention claimed is:

1. A positive electrode active material for a lithium secondary battery which has a composition of [Formula 1] below, and a layered non-rocksalt-type structure, wherein excess lithium is present to be inappropriate for a site balance, and the excess lithium enters an octahedral site and a tetrahedral site:

$$Li_{1+x+y}M_{1-y}O_2 \quad [Formula 1]$$

(x is an amount in which the excess lithium enters the tetrahedral site between a lithium layer and a transition metal layer, y is an amount in which the excess lithium enters the octahedral site of the transition metal layer, x and y are values that satisfy the charge balance, $0<x<1$, $0<y<1$, and M is at least one selected from the group consisting of Al, Mg, Mn, Ni, Cr, V, Fe, Nb, Mo, Ru, Zr, Ir, Sc, Cu, Zn, Y, Tc, Rh, Pd, Ag, Cd, La, Hf, Ta, W, Re, Os, Pt, Au and Hg).

2. The positive electrode active material for a lithium secondary battery of claim 1, wherein the x and y are greater than 0 and less than 0.3, and the transition metal constituting the layered non-rocksalt-type structure has cation disordering of 0-30% between a lithium layer and a transition metal layer.

3. The positive electrode active material for a lithium secondary battery of claim 1, wherein when analyzing through HAADF and ABF of STEM, the excess lithium is present in the octahedral site and the tetrahedral site of the transition metal layer, and an element distribution having a form, in which cation disordering between a lithium layer and a transition metal layer of a layered structure is present at the same time, is observed on a scale of 2 nm to 100 nm.

4. The positive electrode active material for a lithium secondary battery of claim 1, wherein when analyzing with Raman spectrometer, an area in 600-700 $cm^{-1}$, which is a range of Raman shifts by a spinel, is 10% or more of an entire area.

5. The positive electrode active material for a lithium secondary battery of claim 1, wherein when analyzing with Li-NMR, an amount of lithium in 700-900 ppm which is a range that the lithium present in the tetrahedral site exhibits is 5-30% of a total amount of lithium.

\* \* \* \* \*